July 5, 1927.  H. D. MORTON  1,634,624
AUTOMATIC ELECTRIC ARC WELDING DEVICE AND METHOD OF OPERATING THE SAME
Filed Jan. 16, 1924  6 Sheets-Sheet 1
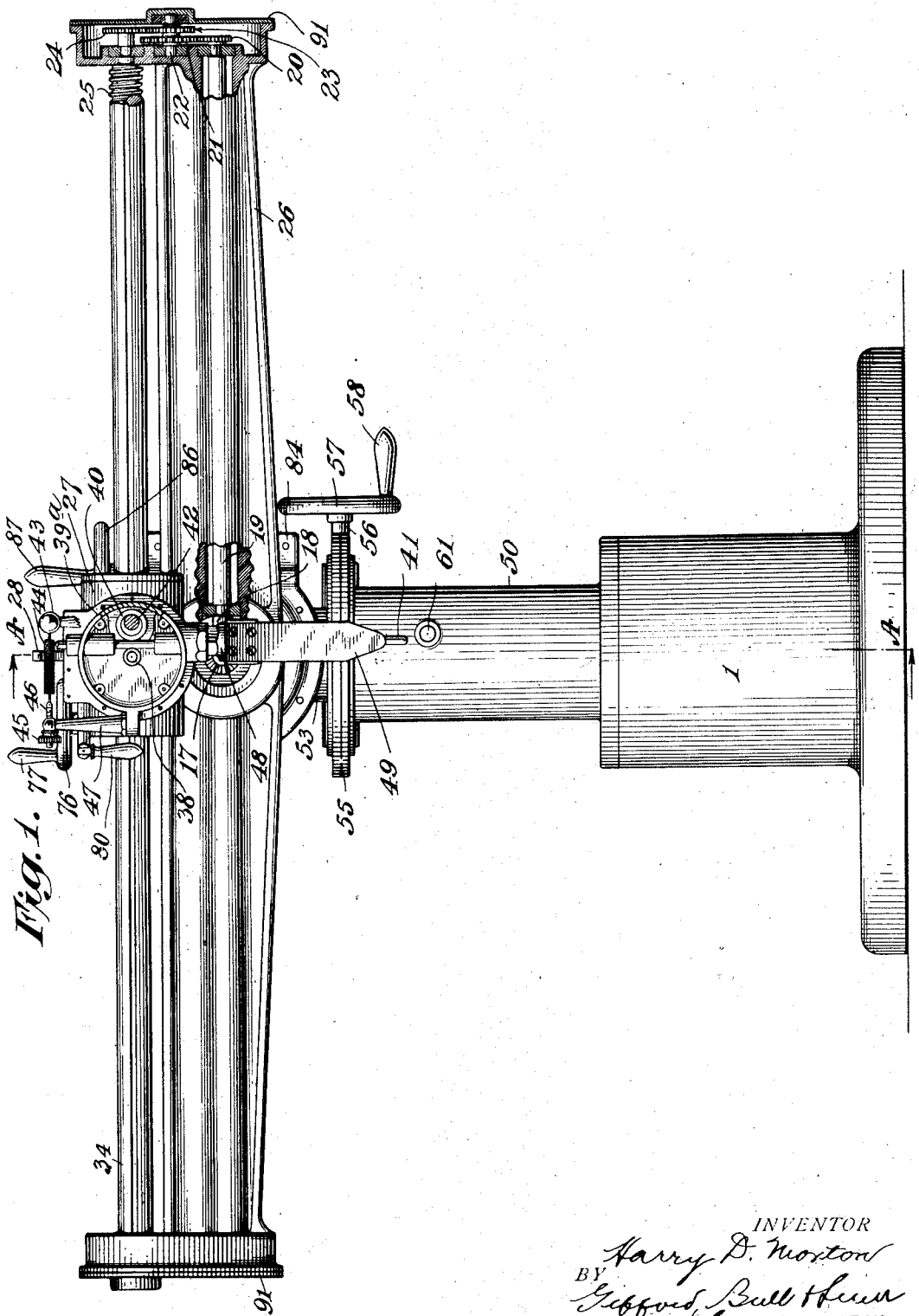
INVENTOR
Harry D. Morton
BY Gifford, Bull & Hunn
ATTORNEYS

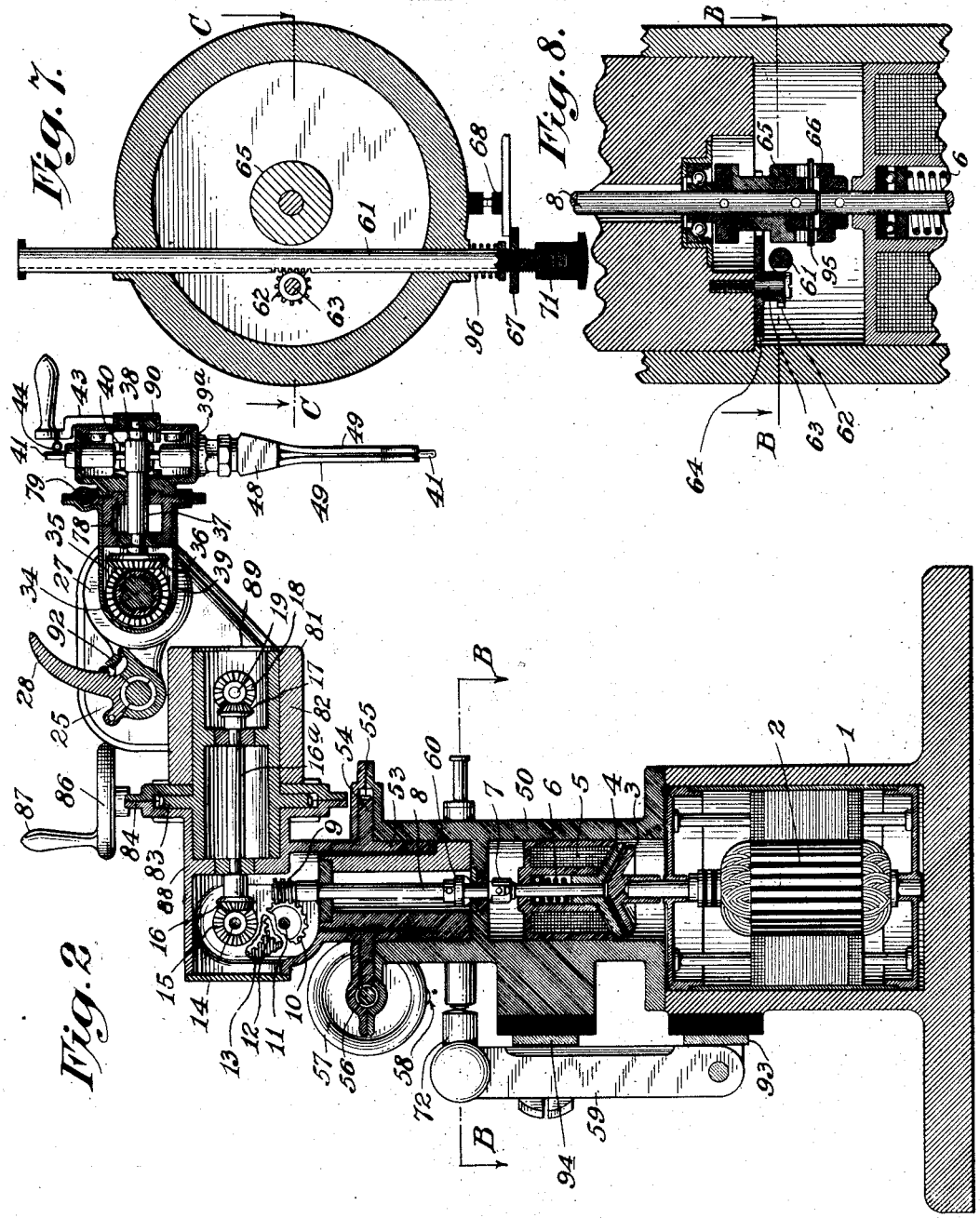

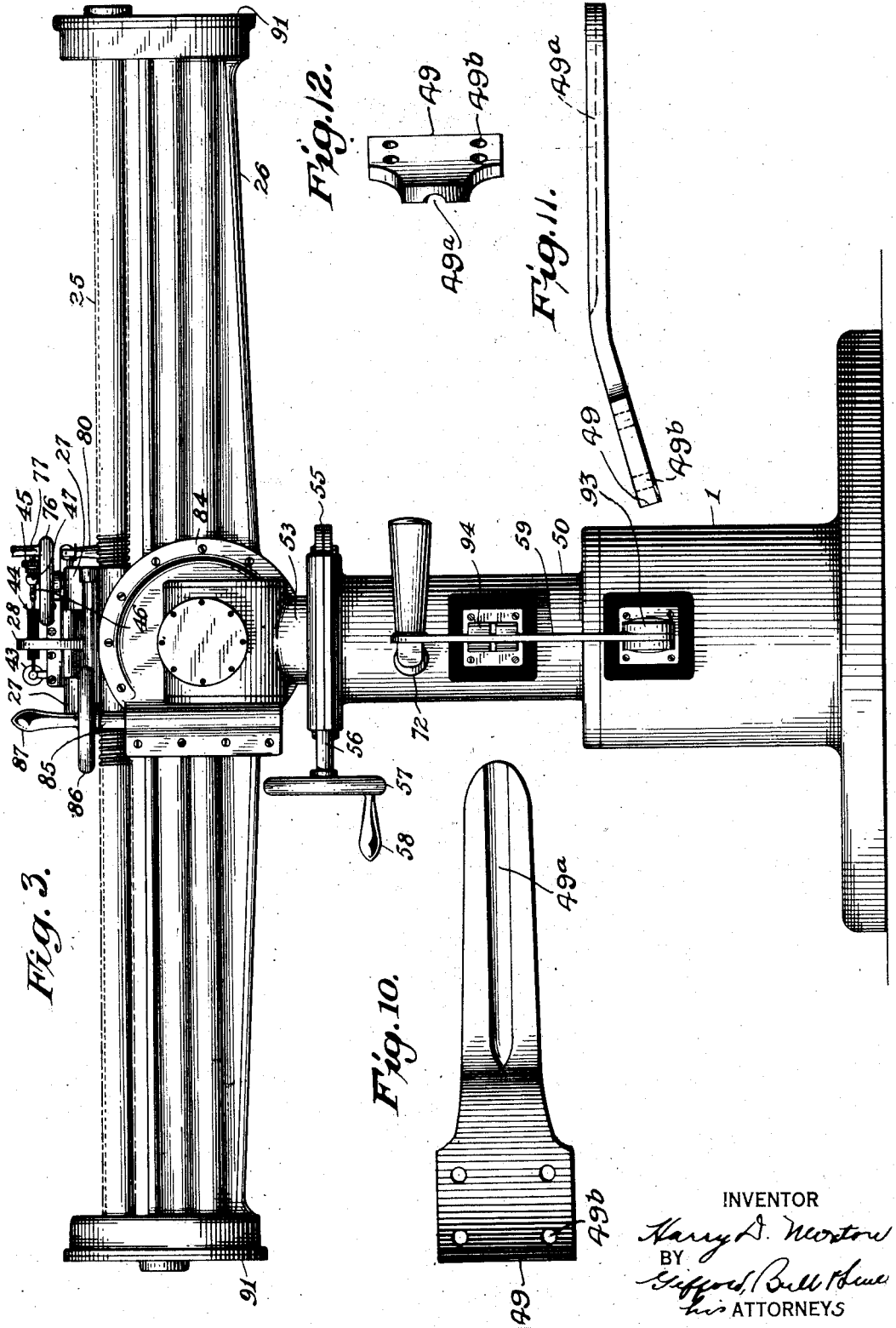

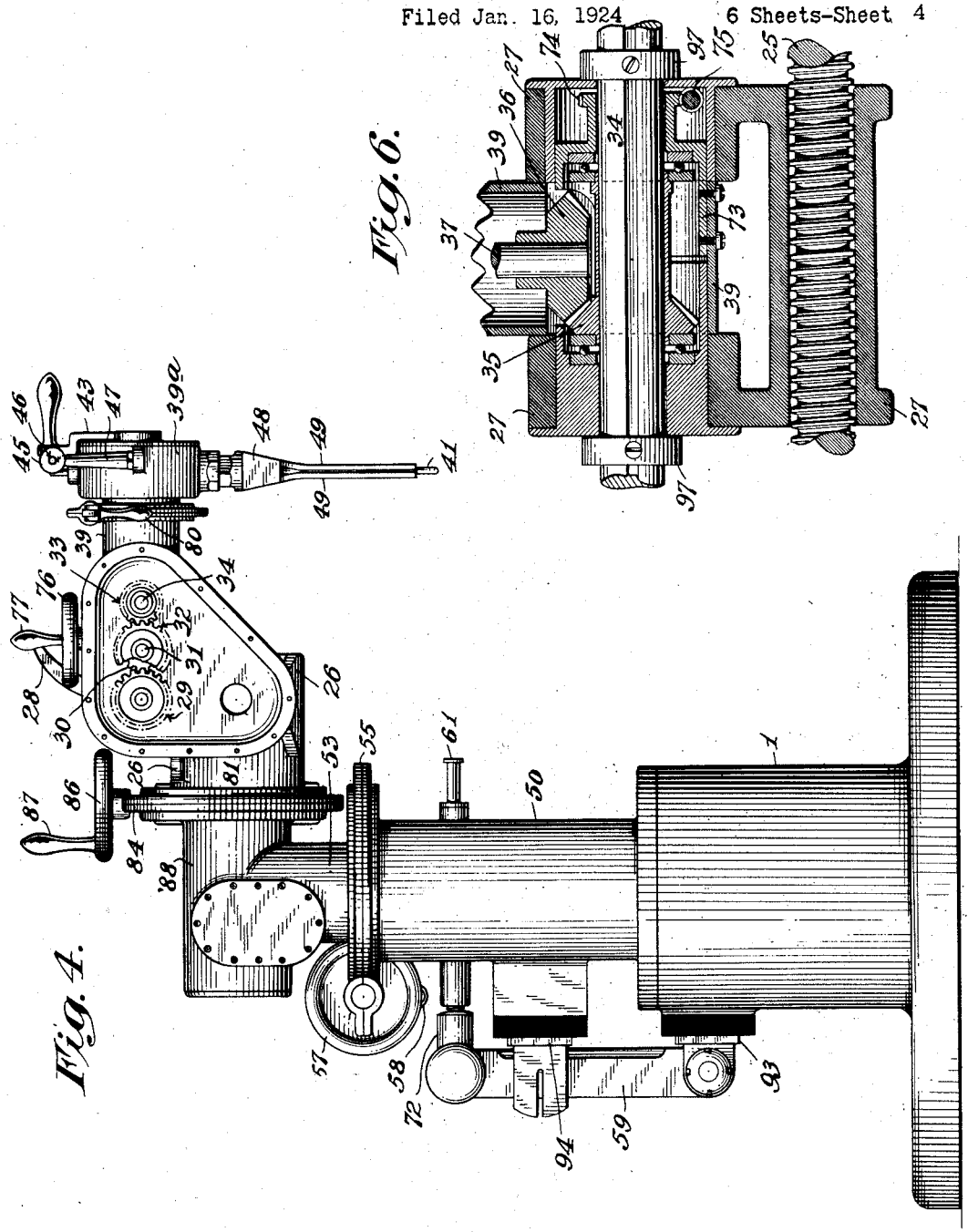

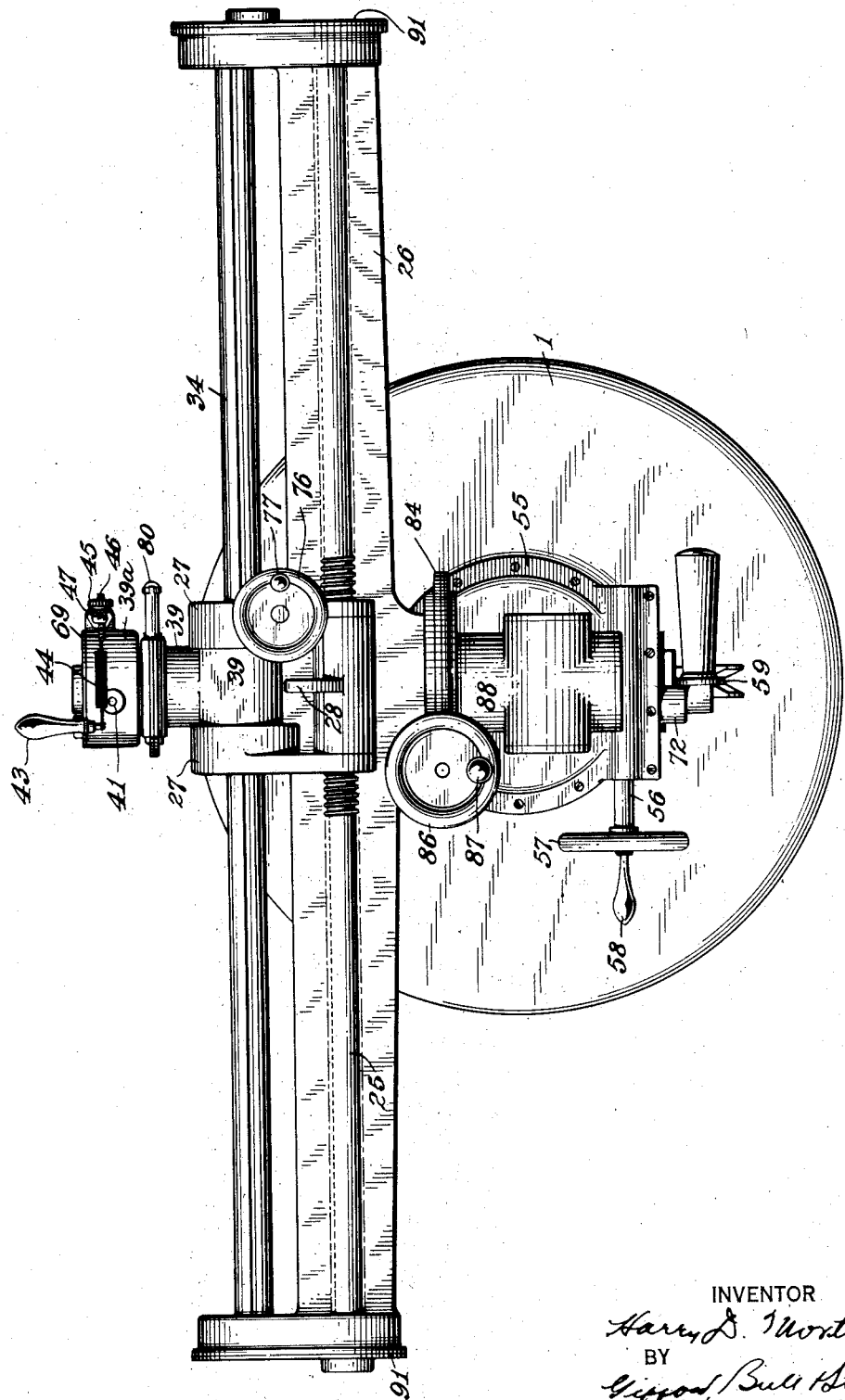

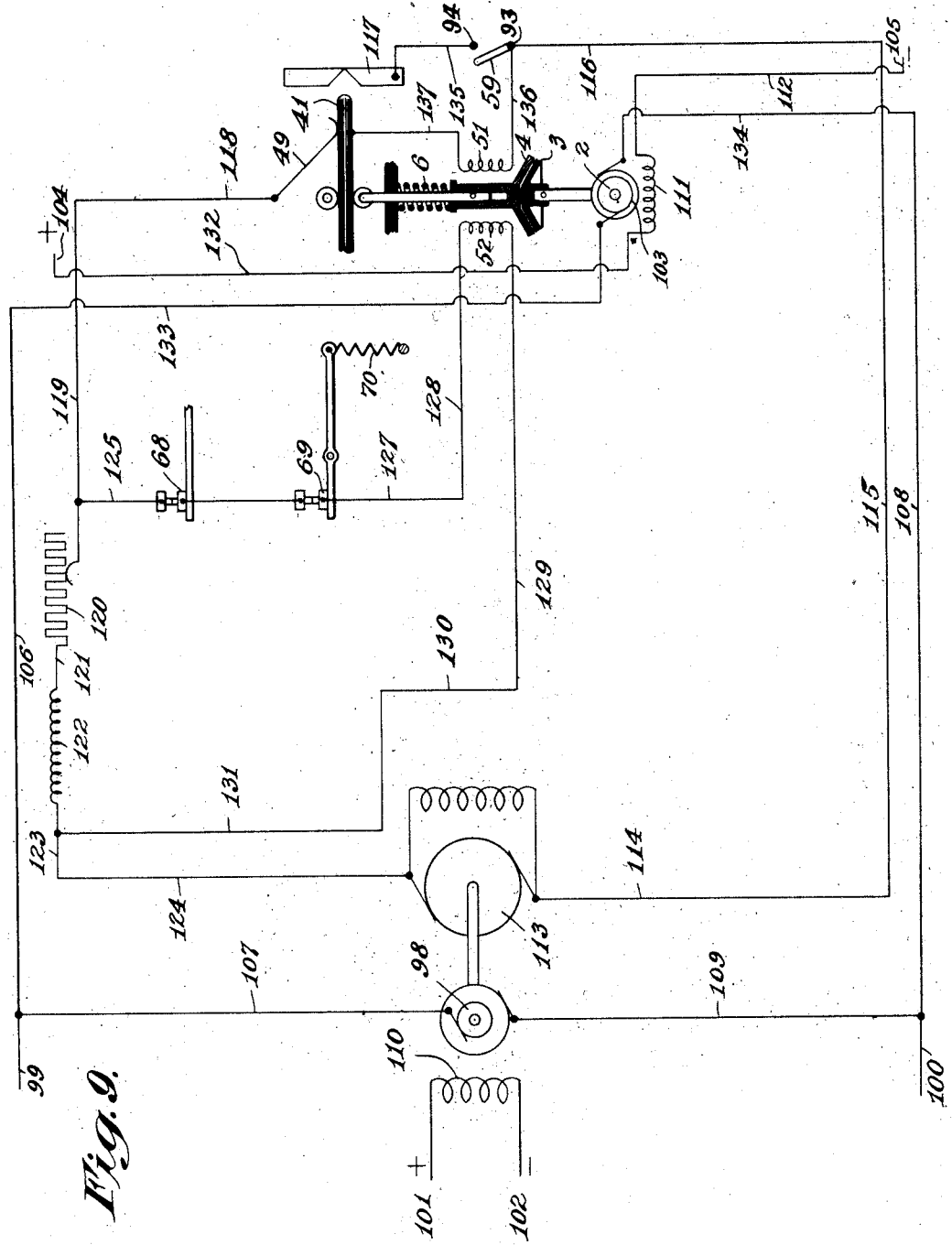

Patented July 5, 1927.

1,634,624

UNITED STATES PATENT OFFICE.

HARRY D. MORTON, OF NEW YORK, N. Y.

AUTOMATIC ELECTRIC-ARC WELDING DEVICE AND METHOD OF OPERATING THE SAME.

Application filed January 16, 1924. Serial No. 686,537.

The following is a description of an automatic electric arc welding device and the method of operating the same embodying my invention in the form and manner at present preferred by me; but it will be understood that various modifications and changes may be made without departing from the spirit of my invention and without exceeding the scope of my claims.

My invention will best be understood by reference to the accompanying drawings, in which I have illustrated the preferred form of device for carrying out my invention, and in which Fig. 1 shows a front elevation of the machine, partly in section, with the covers 89 and 90 of Fig. 2 removed; Fig. 2 shows the machine in section on the line A—A of Fig. 1; Fig. 3 is a rear elevation; Fig. 4 is a side elevation showing the cover 91 of Figs. 1 and 3 removed; Fig. 5 is a plan view of Fig. 3; Fig. 6 shows in horizontal section a portion of the yoke 27 of Fig. 2, and the parts associated therewith; Fig. 7 is a sectional view on the line B—B of Fig. 2, and on the line B—B of Fig. 8, showing the arc-striking means; Fig. 8 is a sectional view on the line C—C of Fig. 7; Fig. 9 is a wiring diagram illustrating an electrical system which may be employed in conjunction with the welding machine. Fig. 10 is a plan view of one of a pair of electrical contact members comprising an electrode holder; Fig. 11 is a side elevation of said contact member; and Fig. 12 is a right-hand end elevation of Fig. 10.

Like reference characters indicate like parts throughout the drawings.

Referring to the drawings, the device is supported upon the hollow base 1, preferably formed of heavy material such as cast iron, in order to afford a substantial foundation. This base contains a motor 2, as shown in Fig. 2, the shaft of which motor is vertically arranged. Attached to the armature shaft of this motor is the male clutch member 3, coacting with the female clutch member 4, forming the armature of electro-magnet 5, said female clutch member and electro-magnet being enclosed in the hollow column 50. The pull of the electro-magnet 5 is opposed by a spring 6. Through a slip coupling 7 the drive of the motor 2 is transmitted by the clutch mechanism to the shaft 8, carrying at its upper end the worm 9, meshing with and driving the worm gear 10, mounted on the shaft 11, carrying the spur gear 12. This spur gear 12 meshes with and drives the spur gear 13, mounted on the shaft 14, carrying the bevel gear 15, meshing with and driving the bevel gear 16, mounted on the shaft 16ª. The opposite end of shaft 16ª carries the bevel gear 17, meshing with and driving the bevel gear 18, which latter bevel gear is mounted upon the shaft 19, as shown in Fig. 1, the opposite end of which shaft carries the spur gear 20, meshing with and driving the idler spur gear 21, mounted upon the shaft 22, which also carries the spur gear 23, meshing with and driving the spur gear 24, mounted upon the lead screw 25. This lead screw is supported between bearings in the housings at the ends of the girder structure 26. Slidably supported upon this lead screw 25 is the yoke 27, as shown in Figs. 3 and 5, propelled along said lead screw by the hinged member 28, the lower part of which hinged member forms a nut, carried, when in mesh, by the threads of said lead screw. The opposite end of the lead screw 25 carries the spur gear 29, as shown in Fig. 4, meshing with idler spur gear 30, mounted upon shaft 31, which also carries the spur gear 32, meshing with and driving spur gear 33, mounted upon the keywayed shaft 34, shown in Fig. 1. Keyed to this keywayed shaft, slidable thereon, and rotating therewith, is the bevel gear 35 driving the bevel gear 36, mounted upon the shaft 37, at the opposite end of which is mounted the driving welding-strip feed roll 38, as shown in Fig. 2. As appears in Fig. 6, bevel gear 35, together with its attachments, is enclosed in a housing, located between the arms of yoke 27. Thus the rotation of the lead screw 25, when the nut portion of the hinged member 28 is held in mesh therewith by spring 92, shown in Fig. 2, carries the yoke 28 along the lead screw 25, and the yoke, in turn, carries the bevel gear 35, together with the welding head frame 39 and its associated parts, along the keywayed shaft 34—thus effecting a traverse of the welding head in a path adjacent to the work. Simultaneously with this movement of the welding head along its track, the rotation of the keywayed shaft 34 and of bevel gear 35, keyed to and rotating with said shaft, causes the rotation of the coacting bevel gear 36, shaft 37, and driving welding-strip feed roll 38, mounted on said last mentioned shaft.

Driving feed roll 38 and idler feed roll 40 (shown in Fig. 1) preferably have serrated perimeters for securely gripping the welding strip 41, positioned therebetween. Idler feed roll 40 is mounted upon eccentric shaft 42, as shown in Fig. 1. Attached to this eccentric shaft is the handle 43, carrying at its upper end the coiled spring 44, the tension of which is adjustable by means of the nut 45 on the screw 46, supported in the post 47. In this manner, very considerable pressure may be applied to the welding strip 41, causing the circumferential teeth of the feed rolls to bite into the welding strip and thereby insure a positive feed.

The welding strip 41 is fed through the welding head 39$^a$ and through the electrode guide 48, carrying the electrical contact members 49—49, which may be of any desired length. The inner portions of these contact members are preferably grooved to conform to the size and shape of the welding strip employed; and as the contact members are under tension, an intimate electrical contact of large area is maintained between the contact members and the welding strip. As is well known by those skilled in this art, the quality of metallic arc welds improves with increase in current density in the electrode. Because of the relative movement between the feed rolls and the welding strip, it is highly desirable that means be provided for maintaining at a minimum the resistance between such rolls and strip. It has been customary in the prior art devices to convey current to the welding strip through the feed rolls, thus affording merely a line or a point contact, with consequent high resistance. As a result, the rolls heat, and arcs are sometimes formed between the same and the welding strip, causing the rolls to become burned and pitted. I overcome these difficulties by feeding the welding strip through two relatively long contact members 49—49, each of which is provided with a groove 49$^a$, and which, by their coaction, apply considerable pressure to the welding strip in its passage therebetween. Each of these contact members is provided with holes, such as 49$^b$, whereby it may be rigidly attached at its upper end, as by screws, to electrode guide 48. Welding current is carried from one pole of the generator to the lower terminal 93 of the welding switch 59, through the blade of said switch to upper terminal 94, from said upper terminal to the work, as shown in Fig. 9, through the arc, the welding strip 41, the contact members 49—49, the electrode guide 48, through a lug or terminal (not shown) located between the upper hexagonal portion of electrode guide 48 and the lower hexagonal portion of the welding head 39$^a$ (Fig. 2), said electrode guide being preferably connected to the welding head by means of a screw thread, through a cable to the opposite pole of the welding generator. I am thus enabled to employ a high current density in the welding strip, the advantages of which will hereinafter be explained; and also to convey the welding current to the electrode at a point close to the arc, the desirability of which procedure is fully set forth in my pending application Serial No. 432,951, filed December 24, 1920.

In conjunction with the present machine, I preferably employ the welding system disclosed in my pending application Serial No. 601,475, filed November 17, 1922, wherein the welding strip is continuously fed at a constant rate and the arc is maintained by correctively varying the wattage consumption at the arc. In the system described in my aforesaid application, a synchronous motor drives the welding strip feeding means, and, in the present instance, such a motor not only drives the welding strip feeding means but also produces traverse of the arc over the work material. On account of the complications connected with the starting of such a motor, and for other reasons, it is desirable that it should not be stopped at the end of each weld, but should be allowed to run continuously. Further, no matter what type of motor is employed, the inertia of its armature of course precludes the possibility of interrupting the movement of the mechanism immediately upon the extinction of the arc, with the result that, with a very short arc, the welding strip may again be brought into contact with the work, and, by reason of being still plastic, it may adhere to the work. I therefore provide the electro-magnetic clutch comprising the male clutch member 3, the coacting female clutch member 4, forming the armature of the differential windings 51 and 52 of the magnet 5, which clutch device, while permitting continuous rotation of the motor, insures that the feeding mechanism shall operate whenever there is an arc, and shall cease operation immediately upon the occurrence of either a contact of the electrodes or a rupture of the arc, the latter resulting, for instance, from the opening of the welding switch or from the arc passing off the work. The operation of this electro-magnetic clutch is as follows: The device is equipped with two differential windings, of which 51 of Fig. 9 is in shunt to the arc, one terminal being attached to the live pole 93 of the welding switch 59, and the other terminal being electrically connected to the welding strip; and coil 52 is in shunt to the stabilizing resistance and the reactance, or to the entire resistance of the welding circuit external to the arc. These two windings are so proportioned that when the arc is in operation, they neutralize each other, and the spring 6 maintains the female clutch member 4 in contact with the continuously rotating male clutch member 3, thus producing a continuous movement of the welding head with reference to the work and a continuous feeding of the welding strip to maintain the arc.

In order to prevent slippage between the clutch members during the welding operation, and to insure prompt stoppage of the mechanism upon the extinction of the arc, I preferably interpose between the clutch faces and also between the upper portion of the female clutch member and the magnet frame, some material such as cork or other suitable material, having a high coefficient of friction.

When the device is employed as a portable welder on large structures, the mode of operation is as follows: Assuming that it is desired to make a horizontal weld directly below the welding head, the girder structure 26, supporting the lead screw 25 and the keywayed shaft 34, carrying the welding head frame 39, will be in a horizontal position, as shown in Figs. 1 and 3; and the welding head will be in the position shown in Fig. 2. The operator places the device adjacent to the work, upon a scaffold or other supporting structure, at a convenient height. In order to facilitate aligning the welding head track with the joint to be welded, I provide means whereby the entire girder structure 26, with its associated parts, may be swiveled or rotated, in a horizontal plane, about the vertical axis of the column 50 and the base 1. These means comprise the tubular member 53, as shown in Fig. 2, integral with which is flange 54, forming a worm wheel, which is tightly gripped in the housing 55. Meshing with and driving this worm wheel is the worm 56, upon the outer end of the shaft of which worm is the handwheel 57, carrying the handle 58. The operator turns the handwheel 57, causing the supporting structure for the girder structure 26, together with the girder structure, to rotate, in order to bring the track into alignment with the joint to be welded, before the electrode is placed in contact with the work.

With the device properly positioned with reference to the work, the operator moves the handle 43 to the right, as shown in Fig. 1, thereby releasing the welding strip from the grip of the feed rolls 38 and 40; and places the welding strip 41 in contact with the work. He then releases the handle 43, allowing the feed rolls 38 and 40 to again grip the welding strip. He then closes the welding switch 59, as shown in Fig. 2 and in Fig. 4, which results in welding current flowing through the circuit.

Before the welding switch 59 is closed, the coil 51 of the electro-magnet 5, which coil is in shunt to the arc, receives the full voltage of the welding system. The welding circuit is open, and the switch 68 is also open (as will hereinafter appear), so no current flows through the coil 52, which is in shunt to the resistance external to the arc. The electromagnet, therefore, keeps the female clutch member 4 out of contact with the rotating male clutch member 3, and there is neither movement of the welding head nor feeding of the welding strip. When welding current flows through the system, the coil 51, in shunt to the arc, is practically de-energized, and simultaneously the coil 52 receives its maximum energization, thus maintaining the female clutch member 4 out of contact with the male clutch member 3.

In Fig. 2 I have indicated in a general way one method of striking the arc, whereby a pawl (not shown) is caused to engage the ratchet 60, as a result of the manual closing of the welding switch 59. The ratchet 60 being pinned to the shaft 8, this shaft, together with the gear and shaft mechanism above it, as well as the direct feed roll 38, are caused to rotate, retracting the welding strip 41 from the work, and thereby producing an arc.

In Figs. 7 and 8 I show a somewhat different structure for accomplishing this result. The rack 61 meshes with the small pinion 62, mounted upon the shaft 63. Integral with this pinion is the large pinion 64, meshing with a gear integral with the member 65. At the instant the welding switch 59 is closed, the electro-magnet 5 is holding its armature 4, comprising the female clutch member, out of engagement with the coacting male clutch member 3, hence the shaft carrying the slip joint 7 of Fig. 2 is not rotating. With the parts in this position, teeth formed in the upper end of member 66 (Fig. 8) engage with corresponding teeth formed in the lower end of member 65. The member 65 is not attached to the shaft 8, but the latter rotates freely in it. Further forward movement of the blade of the welding switch 59 brings the boss 72 (Fig. 2) into contact with the cap 71 (Fig. 7), mounted upon the rack member 61, causing the rack to rotate the pinions 62 and 64, and the gear member 65. By reason of the engagement of the teeth of the part 65 with the teeth of the part 66, rotary movement is communicated through the pin 95 (Fig. 8) to the shaft 8, with its associated parts, comprising gears and shafts, and the driving feed roll 38, retracting the welding strip 41 from the work and striking an arc. Immediately the arc is struck, the differential coils 51 and 52 (Fig. 9) of electro-magnet 5 neutralize each other, and the spring 6 moves the female clutch member 4 into contact with the rotating male clutch member 3, feeding the welding strip toward the work and traversing the arc over the work. The downward movement in the slip joint 7 removes the teeth of the member 66 from engagement with the teeth of member 65, and during the welding operation the shaft 8 rotates in the member 65, the latter being prevented from rotating by the pinions 64 and 62 and the rack 61. When the welding switch is opened, the spring 96 restores the rack 61 to its original position.

Mounted upon the rack member 61 is the switch closing disk 67, the purpose of which is to close the switch 68, in series with the coil 52, as shown in Fig. 9—which coil is in shunt to the resistance external to the arc— at the instant of closing of the welding switch 59. When the welding switch is opened, the circuit of coil 52 is also opened, so that an accidental closing of the welding circuit other than by a closing of the welding switch cannot start movement of the welding head and feeding of the welding strip.

The cap 71, shown in Fig. 7, is adjustable on the rack member 61, so that the extent to which the welding strip 41 is retracted from the work, and, consequently, the length of the arc initially struck, may be adjusted to meet the requirements of any particular class of work.

Referring again to Fig. 9: I also employ in series with the coil 52 (in shunt to the resistance external to the arc) the switch 69, normally maintained closed by the spring 70. This switch may be conveniently mounted either at the end of the girder structure 26, where movement of the welding head 39ª will automatically open it; or it may be mounted upon a collar on keywayed shaft 34, on the lead screw 25, or elsewhere on the girder structure 26. Thus the automatic opening of the switch at any desired point will de-energize the coil 52, allow the coil 51 to separate the clutch members 4 and 3, and interrupt the feeding of the welding strip and the movement of the welding head 39 along its track. In this manner the welding operation may be automatically interrupted at any desired point. Additionally, this switch 69 may be arranged, in a manner well known to those skilled in the art, to be manually opened whenever the operator finds it desirable to interrupt the welding operation.

In order to compensate for inaccuracies in the edges of the plates to be welded, I provide means for permitting the operator to make necessary adjustments of the position of the welding head during the welding process. These means consist of so mounting the welding head that it may be caused to swivel or rotate about its axis of support. Referring to Fig. 6: Rigidly attached to the welding head frame 39 is the cylindrical member 73, carrying at its outer end the worm wheel 74, meshing with which is the worm 75, having its bearings (not shown) in the upper and lower edges of the housing of yoke 27. The yoke being supported by the lead-screw 25 and by the keywayed shaft 34, the worm 75 locks the welding head frame 39 in position. At the upper end of the shaft of the worm 75 is the handwheel 76, having the handle 77, as shown in Figs. 1, 3 and 4. Thus whenever the operator, during the welding process, observes that the joint being welded is varying from a straight line, he may, by turning the handwheel 76 in one direction or the other, move the end of the welding strip 41 with reference to the work and thus maintain the arc at the juncture of the plates. This tiltable feature of the welding head is also of advantage in permitting the welding strip to be fed toward the work at any angle between the vertical and horizontal positions, to meet the requirements of various classes of welding.

When a weld is completed and the arc has been ruptured, the operator moves the lever 28 to the left as shown in Fig. 2, thereby disengaging the lower threaded portion from mesh with the lead screw 25. He then moves the welding head back to its original position on the track, and allows the threaded portion of the part 28 to again come into mesh with the lead-screw. The carriage should not be brought into actual contact with the gear housing at the end of the girder structure 26, as this would prevent the reversal which is required to retract the welding strip to strike the arc.

Referring to Fig. 2: The welding head is also rotatable about the shaft 37 to vary the angle at which the arc impinges upon the work. This is accomplished by providing the welding head with the flange 78, the perimeter of this flange being machined to constitute it a worm wheel. Meshing with this worm wheel is the worm 79. Attached to the shaft of this worm is the handle 80, shown in Fig. 1 and in Fig. 4. The turning of this handle causes the welding head to rotate so that it may be adjusted to any desired angle for horizontal, vertical, overhead or other classes of welds.

As shown in the drawings, the machine is adjusted for the making of horizontal welds. I also provide means whereby the girder structure 26, together with the track and the welding head, may be adjusted to make welds at any desired angle between the horizontal and the vertical positions. The means for accomplishing this result are as follows: Referring to Fig. 2, the hub 81 of the girder structure 26 is rigidly attached to the cylindrical member 82, formed upon which is the flange 83, the perimeter of which is machined as a worm wheel, which is rigidly held in the housing 34. Meshing with this worm wheel is a worm, the shaft 85 of which is shown in Fig. 3. Attached to this shaft is the hand wheel 86, carrying the handle 87. Turning of this handle causes the cylindrical member 82, carrying the girder structure 26, to rotate as shown in Fig. 2.

Provision is made for change-speed gears, as shown at 12 and 13 of Fig. 2, and also at 20, 21, 23 and 24 of Fig. 1, and at 29, 30, 32 and 34 of Fig. 4—thus permitting a wide range of rates of welding strip feed and welding carriage travel.

The device readily lends itself to use as a stationary automatic welder. When properly positioned and supported with reference to a lathe, shaper, boring mill, milling machine or other work-moving means, it is only necessary to permanently disengage the part 28 from mesh with the lead-screw 25—as, for instance, by disconnecting the spring 92 and dropping the part 28 to the left, as shown in Fig. 2. Collars such as shown at 97—97 of Fig. 6 may normally be located at the extreme ends of keywayed shaft 34; and when it is desired to employ the machine as a stationary welder, the carriage may be located at any desired point on the track and held in that position by clamping these collars to the shaft. The lead-screw 25 and keywayed shaft 34 will continue to rotate, but the welding head will remain stationary on the track. On account of its extreme adjustability, the device is applicable to the production of widely varied welds upon work which is moved with reference to the arc. It may, for example, be mounted by suitable fixtures upon the carriage of a lathe to cause the arc to traverse a rotating shaft requiring to be completely covered with welding material. Its many uses as a stationary welder will be apparent to those skilled in the art.

Referring to the wiring diagram Fig. 9: The alternating current motor 98, which may be of the synchronous type and which drives the welding generator 113, receives its current from the source 99—100, through the lines 107 and 109. Its field 110 is energized by direct current from the source 101—102. The alternating current synchronous welding machine motor 2 also receives its current for its armature 103 from the source 99—100, over the lines 106, 133, 108 and 134. Its field 111 is energized by direct current from the source 104—105, over the lines 112 and 132. Welding current from the generator flows from the positive pole over line 114, line 115, line 116, through switch 59, to the work 117, between which and the welding strip 41 an arc is adapted to be maintained; from the welding strip to the contact member 49, the line 118, line 119, adjustable stabilizing resistance 120 (preferably of the zero-temperature coefficient type), line 121, reactance 122, line 123, line 124, to the negative pole of generator 113.

Current for the electro-magnet coil 52 flows from line 119 to line 125, switch 68, switch 69, line 127, line 128, through coil 52, line 129, line 130, line 131, to line 123—the voltage being represented by the drop in potential across resistance 120 and reactance 122.

Current for the electro-magnet coil 51 flows from the live pole of switch 59 to line 136, through coil 51, line 137, to the welding strip 41, the voltage being represented by the drop in potential across the arc.

In my United States Patent No. 1,278,985, dated September 17, 1918, I show, in combination with arc-maintaining means, a device for traversing the arc over large stationary objects, such as ships, railway cars, steel buildings, bridges and other structural steel work. The present invention constitutes an improvement upon the device of my said patent, by reason of being more readily portable and adjustable, in being adaptable to the welding not only of large stationary objects, but also of smaller movable objects, and in many other important particulars. The described device is self-contained and readily portable, and at the same time universally adjustable, thereby making it possible to weld in any location, in any desired plane, and at any required angle.

My invention reduces to a negligible point vibrations which, if present, would have the effect of causing variations in the arc length and produce deleterious results in the weld.

A desirable feature of the described machine is that means are provided for initially striking the arc with certainty, and for maintaining the welding pencil in contact with the work for the minimum time during the arc-striking operation, which prevents the welding pencil from softening and adhering to the work material.

Unless the metallic arc is maintained substantially constant in length, the heating effect varies and this results in a lack of uniformity in the weld. Further, and even more important, a lengthening of the metallic arc produces a more or less extensive rupture of the protective envelope of inert gases which surrounds the arc stream when the arc is short; and the vaporized and molten metal of the arc stream is thus subjected to attack by atmospheric oxygen and nitrogen. Iron oxide and iron nitride are instantly formed, and these impurities are carried by the arc stream into the weld, destroying its ductility and greatly decreasing its tensile strength. I have therefore provided means for maintaining the arc length constant with a very high degree of accuracy, thus insuring uniformity of thermal conditions and practically precluding the possibility of oxidation and nitrogenization of the weld.

Experience has shown that in automatic metallic arc welding the quality of welds improves with increased current density in the welding pencil. Additionally, the employment of high current values results in increased welding speeds. I therefore provide means whereby a current density of 30,000 amperes per square inch or an even higher density may be employed—whereas in manual metallic arc welding the limit of current density appears to be of the order of 10,000 amperes per square inch.

I have found that in automatic metallic arc welding the character of the welds is affected by the angle at which the arc impinges upon the work material. I have found that while, in many cases, entirely satisfactory results are obtained when the electrode is inclined at an angle of about 15° from the vertical, in other classes of welding the results appear to improve if this angle is increased or decreased. I have therefore provided means whereby any desired angular adjustment may be obtained, depending upon the work in hand.

As will appear from the drawings and description thereof, the welding head moves in a straight line adjacent to the work. While this movement meets all requirements in cases where a substantially straight joint is to be welded, it frequently occurs that steel plates, especially those of considerable thickness, are not sheared with straight edges, as the shear tends to "walk." In other cases, the design of the structure requires that the line of the weld shall be other than a straight line. To provide for these contingencies, I employ means whereby, during the progress of the weld, the operator may have manual control of the arc to direct it to the desired point on the work material.

What I claim and desire to secure by Letters Patent of the United States is:

1. The improvement in electric arc welding which consists in manually striking the arc, in feeding the electrode to the work during normal operation, and in disconnecting the feeding means from its actuating means upon extinction of the arc.

2. The method of electric arc welding which consists in feeding a welding strip constituting one electrode to an arc struck between said strip and the work constituting the other electrode, traversing the welding strip feeding means along a track adjacent to the work, and manually rotating said welding strip feeding means transversely of the seam to be welded during the welding operation to compensate for variations in said seam.

3. In an electric arc welding machine, a base, a housing mounted upon said base, a track support carried by said housing, a track, and a welding head upon said track and rotatable in two planes.

4. In electric arc welding wherein an arc is struck between a welding pencil and the work to be welded, automatic means for feeding the welding pencil to the work, automatic means for traversing the arc over the work, and manually operable means for tilting the welding pencil transversely of the seam to be welded.

5. In an electric arc welding machine, a base, a track supported by said base and adapted to be positioned adjacent to the work to be welded, a welding head, means for automatically moving said welding head along said track, and manually operable means for pivotally moving said welding head transversely of the joint to be welded in order to compensate for irregularities in said joint.

6. In electric arc welding wherein a welding strip constitutes one electrode and the work constitutes the other electrode, means for feeding the welding strip to the work, a lead screw for moving the feeding means over the work, and manually rotatable means for varying the position of the welding strip transversely of the joint to be welded.

7. In an automatic electric arc welding machine, a supporting structure adapted to be positioned adjacent to the work to be welded, means for continuously feeding a welding pencil to said work, automatic means for moving said feeding means in a predetermined path along said supporting structure, and means manually rotatable during the progress of the weld for varying the line of direction of the weld.

8. In an automatic electric arc welding machine, a base, a track supported by said base, and a welding head movable along said track and tiltable transversely of the joint to be welded.

9. In an automatic electric arc welding machine, a base, a track supported by said base, and a welding head movable along said track and rotatable in the line of the weld and transversely of the line of the weld.

10. In an automatic electric arc welding machine, a welding head adjustable in and transversely of the line of the weld, and a support for said welding head rotatable in two planes.

11. In automatic electric arc welding wherein an arc is maintained between a metallic welding strip and the work to be welded, a non-circular groove member pressing against said welding strip to guide the same and to convey current thereto.

12. In an electric arc welding machine, electrode feeding means, driving means for said feeding means, means responsive to the extinction of the arc for disconnecting said feeding means and said driving means, and automatic means for maintaining the arc.

13. In electric arc welding wherein the work constitutes one electrode and a welding pencil constitutes the other electrode, means for feeding the pencil toward the work throughout the welding operation, means for controlling the arc by the direct action of its fusing energy, and automatic means operative upon the striking of the arc for actuating said feeding means.

14. In an automatic arc welding machine, means for feeding a welding pencil constituting one electrode toward the work constituting the other electrode, means for driving said feeding means, a welding switch and manually actuated means associated with said switch for striking an arc, and automatic means operative upon the striking of the arc for connecting the driving means to the feeding means.

15. In an arc welding machine wherein a welding pencil is fed to the work, a welding head, a support for said head, means for feeding the welding pencil, a motor for driving said feeding means, and automatic means for connecting said motor to said feeding means upon the striking of an arc and for disconnecting said motor from said feeding means upon the extinction of the arc.

16. In electric arc welding, electrode feeding means and friction braking means acting upon said feeding means and governed by the extinction of the arc.

17. In an arc welding machine wherein a welding pencil is fed to the work to be welded, continually acting feeding means for said pencil, driving means for said feeding means, a clutch device for connecting said feeding means to said driving means, and braking means for quickly stopping the rotation of the feeding means upon extinction of the arc.

18. In electric arc welding, electrode feeding means, a continuously rotating motor for driving said feeding means, and automatic means for connecting the driving means to the feeding means upon the striking of the arc and for disconnecting the driving means from the feeding means upon extinction of the arc.

19. In an automatic arc welding machine, means for feeding a welding pencil constituting one electrode toward the work constituting the other electrode, means for driving said feeding means, and automatic means controlled by the voltage across the arc and the voltage across the circuit resistance external to the arc for disconnecting the driving means from the feeding means upon the extinction of the arc.

20. In electric arc welding wherein the work constitutes one electrode and a welding pencil constitutes the other electrode, means for continuously feeding the welding pencil toward the work at a constant rate throughout the welding operation, means for traversing the arc over the work to be welded, and means responsive to the voltage across the arc and to the voltage across the resistance of the circuit external to the arc for controlling said feeding and traversing means.

21. In electric arc welding wherein the work constitutes one electrode and a welding pencil constitutes the other electrode, means for continuously feeding the pencil toward the work and differentially-wound electro-magnetic means operative upon the striking of the arc for actuating the feeding means.

22. In electric arc welding, electrode feeding means, a continually rotating motor and a differentially-wound electro-magnetic clutch for connecting said motor to said feeding means.

23. In an electric arc welding machine in which a welding pencil constituting one electrode is automatically fed toward the work constituting the other electrode, feeding means for the welding pencil, a switch for the welding circuit and manually operable means associated with said welding switch for rotating the feeding means to strike an arc.

24. In an electric arc welding machine, a welding head, a track along which said welding head is automatically moved, and a support for said track rotatable in two planes.

25. In an electric arc welding machine, electrode feeding means supported upon a track comprising two rotatable shafts, one of which shafts rotates said feeding means and the other of which shafts traverses said feeding means with reference to work to be welded.

26. In an arc welding machine, a welding head, a plurality of shafts supporting said head, one of which shafts effects continuous feeding of a welding pencil with reference to said head, and the other of which shafts moves said head in a path adjacent to the work to be welded.

27. In an electric arc welding machine, a base, track supporting means mounted upon said base, a track comprising a plurality of rotating shafts, electrode feeding means supported upon said track, and a motor in said base for actuating said electrode feeding means.

28. In an automatic electric arc welding machine, a base, a supporting structure upon said base, and a welding head carried by said supporting structure and rotatable with reference to three axes at angles to the vertical axis of said base.

29. In an electric arc welding machine, a base adapted to be positioned adjacent to the work to be welded, a supporting structure upon said base, a track upon said supporting structure, a welding head upon said track and completely rotatable with reference thereto for feeding a welding strip to the work, and automatic means for effecting relative movement between said welding head and said work.

30. In electric arc welding wherein a welding pencil constitutes one electrode and the work constitutes the other electrode, means for continuously feeding the welding pencil to the work at a constant rate, means for traversing the arc over the work, and means for maintaining the arc by the direct action of its fusing energy.

31. In electric arc welding wherein a welding strip constitutes one electrode and the work constitutes the other electrode, automatic welding strip feeding means, automatic means for moving said welding strip feeding means in a path adjacent to the work, and means for maintaining the arc by the direct action of its fusing energy.

32. In electric arc welding, automatic means for continuously feeding a welding pencil to the work, automatic means for traversing the arc over the work, means for conveying current to the welding pencil at a point close to the arc and means for maintaining the arc by the direct action of its fusing energy.

33. In electric arc welding wherein a welding pencil is clamped between rotating rolls and automatically fed toward the work, the improvement in the method of striking an arc which consists in releasing the grip of the feed rolls, placing the welding pencil in contact with the work, closing the welding switch, and by the same movement manually rotating the feed rolls in a direction to retract the welding pencil from the work.

34. In electric arc welding wherein an arc is maintained between a metallic welding strip and the work to be welded, a grooved member pressing against said welding strip and contacting therewith parallel to the axis thereof to guide the same and convey current thereto.

35. In automatic electric arc welding wherein an arc is maintained between a metallic welding strip and the work to be welded, a non-rotatable grooved member pressing against said welding strip to guide the same and to convey current thereto.

36. In electric arc welding wherein an arc is maintained between a metallic welding strip and the work to be welded, a plurality of non-circular grooved members pressing against said welding strip to guide the same and to convey current thereto.

37. In an electric arc welding machine, a welding switch, means for feeding a welding pencil to the work and means associated with the welding switch for manually rotating the feeding means to retract the welding pencil from the work to strike an arc.

38. In electric arc welding, a welding circuit, a stabilizing resistance included in said circuit, and electrode feeding means controlled by the voltage across the arc and the voltage across resistance of the circuit external to the arc.

39. In an electric arc welding machine, a support, a track mounted upon said support and rotatable with reference thereto, and a welding head carried by said track and rotatable independently thereof in two planes.

40. In an electric arc welding machine, a pedestal, a track supported by said pedestal and rotatable in a plane parallel to the vertical axis thereof, and a welding head movable along said track.

HARRY D. MORTON.